J. A. CRANDALL.
Stick Horse.
No. 230,749. Patented Aug. 3, 1880.
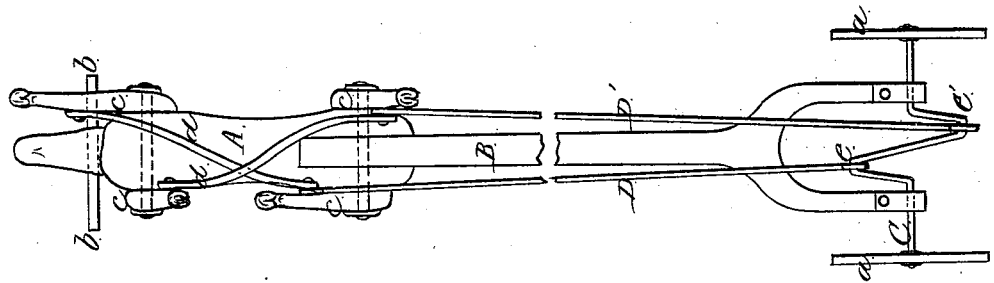
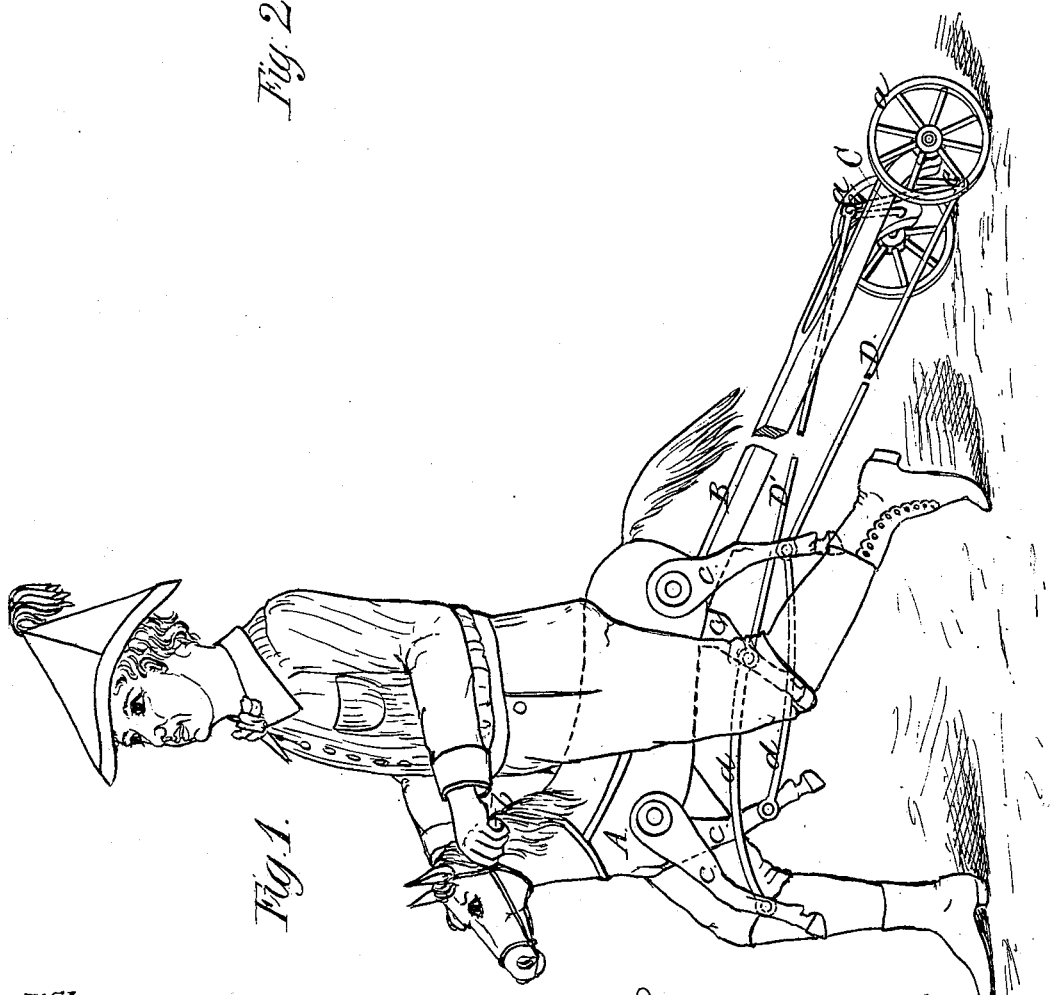

UNITED STATES PATENT OFFICE.

JESSE A. CRANDALL, OF BROOKLYN, NEW YORK.

STICK-HORSE.

SPECIFICATION forming part of Letters Patent No. 230,749, dated August 3, 1880.

Application filed January 5, 1880.

*To all whom it may concern:*

Be it known that I, JESSE A. CRANDALL, of Brooklyn, in the county of Kings and State of New York, have invented an Improved Stick-Horse, of which the following is a specification.

My invention consists of a stick-horse provided with supporting-handles attached to its head in a position convenient to be grasped by the rider, and having pivoted legs which are connected by suitable rods with a crank-shaft that carries the friction-rollers in the lower end of the stick, so that when the horse is held up and the lower end of the stick is drawn along the ground the friction-rollers turn the crank-shaft, and, through the connecting-rods, give motion to the horse's legs.

In the accompanying drawings, Figure 1 is a perspective view of my improved stick-horse with the rider supporting the same; and Fig. 2 is a bottom view of the stick-horse, showing the connection of the horse's legs with the crank-shaft of the friction-rollers.

Referring to the drawings, A represents the horse; B, the stick; C, the crank-shaft on the lower end of the stick, and $a\ a$ are the friction-rollers on the ends of the crank-shaft.

On each side of the horse's head is a pin, $b$, forming supporting-handles, which are grasped by the rider when astride of the horse, so as to suspend the horse in the proper position, as shown in Fig. 1.

The horse's legs $c$ are pivoted to its body, and the front legs are connected to the hind legs by short connecting-rods $d\ d$, pivoted to the legs. Said rods $d$ are arranged to connect the right fore leg with the left hind leg and the left fore leg with the right hind leg, so as to move the legs in a manner similar to the trotting-gait of horses; or the connection may be made in other ways, so as to give imitations of other gaits.

The hind legs are connected by rods D D' with the cranks $e\ e'$, respectively, on crank-shaft C.

When the rider is astride of the horse he grasps the handles $b$, and then, by drawing the stick with him as he walks or runs, the friction-rollers $a$ turn the crank-shaft C, and through the connecting-rods D D' and $d\ d$ motion is given to the legs $c$.

I do not claim the invention otherwise than on an apparatus having but two rollers and the handle $b$, being aware that on four-wheeled devices the connection of the crank-axle with the legs is old; but I do away with two wheels, and enable a child to be amused by the motions of the horse's legs, which he holds suspended, as stated.

I claim—

The stick-horse A, provided with the suspension-handles $b$ and pivoted legs $c$, in combination with the stick B, connecting-rods D D' $d\ d$, crank-shaft C, and a single pair of rollers, $a$, substantially as described.

JESSE A. CRANDALL.

Witnesses:
TOMPSON B. MOSHER,
WILLY G. E. SCHULTZ.